United States Patent [19]
Rizzo

[11] 4,108,424
[45] Aug. 22, 1978

[54] CAGING DEVICE

[75] Inventor: Anthony A. Rizzo, Torrance, Calif.

[73] Assignee: TRW Inc., Redondo Beach, Calif.

[21] Appl. No.: 671,197

[22] Filed: Mar. 29, 1976

[51] Int. Cl.² ........................ F16F 1/18; F16D 11/06
[52] U.S. Cl. .................................. 267/160; 192/82 T;
192/88 A; 192/93 A
[58] Field of Search .............. 267/160, 161; 308/2 A;
64/30 A; 192/65, 82 T, 88 A, 93 A

[56] References Cited
U.S. PATENT DOCUMENTS

| | | | |
|---|---|---|---|
| 2,382,869 | 8/1945 | Fisher | 192/65 |
| 3,556,272 | 1/1971 | Jones | 192/88 A |
| 3,640,363 | 2/1972 | Spalding | 192/65 |
| 3,913,713 | 10/1975 | Figeppert | 192/82 T |
| 3,952,843 | 4/1976 | Campbell et al. | 192/93 A |

Primary Examiner—James B. Marbert
Attorney, Agent, or Firm—John J. Connors; Donald R. Nyhagen; Robert W. Keller

[57] ABSTRACT

A caging device for releasibly caging or clutching two relatively rotatable members to one another, such as a rotatable shaft to a fixed support or two independently rotatable shafts to one another, by axial movement of a clutch or caging member having a conically tapered clutch surface to and from a position of simultaneous engagement of its clutch surface with coaxial conically tapered clutch surfaces on the relatively rotatable members. The caging member can be electromechanically, hydraulically, pneumatically, or thermally actuated.

5 Claims, 5 Drawing Figures

4,108,424

CAGING DEVICE

BACKGROUND OF THE INVENTION

In the past, flexural pivots which support oscillating shaft assemblies have suffered damage from dynamic loads which were experienced during transport. Where the shaft movements have critically close tolerances, even moderate dynamic loads can cause catastrophic failure.

In optical scientific instruments, scanning mirrors are mounted on a shaft having a limited rotation. These shafts, called flexural pivots, because of their light torsional spring rates and low radial load carrying capabilities are selected where power is limited. Further information about flexural pivots may be found in U.S. Pat. Nos. 3,807,029 and 3,811,665. If the optical instruments, such as earth sensors or horizon scanners are used in space vehicles, severe dynamic loads, such as vibration and shock induced by the booster during launch, will sometimes buckle or fracture the flexing elements causing catastrophic failure. For this reason, such instruments are commonly equipped with a caging device for caging or clutching the rotatable member or shaft to the instrument housing to restrain the shaft against rotation.

SUMMARY OF THE INVENTION

This invention provides a novel caging device for releasibly caging or locking two relatively rotatable members to one another to restrain the members against relative rotation. These two relatively rotatable members may be the shaft and housing of an instrument of the kind referred to above, in which case the caging device acts as a brake or lock for restraining the shaft against rotation. Alternatively, the relatively rotatable members may be two independently rotatable members, such as two rotatable shafts, in which case the caging device acts as a clutch for clutching or caging the members to one another for rotation in unison.

According to the invention, the two relatively rotatable members are releasibly caged to one another by a clutching or caging member having a coincally tapered clutch surface coaxial with the relatively rotatable members to be caged. This caging member is movable axially to and from an engaged position wherein its conical clutch surface is disposed in seating contact with conically tapered clutch surfaces on the two relatively rotatable members, such that caging member cages or locks the latter members against relative rotation. Actuating means are provided for actuating the caging member to and from its engaged position. Electromechanical, hydraulic, pneumatic and thermal actuating means are described. According to the preferred practice of the invention, the clutch surfaces on the two relatively rotatable members are arranged in tandem, that is axially spaced, and are conically tapered from a common vertex so as to conform essentially to a common conical configuration.

DESCRIPTION OF THE PREFERRED EMBODIMENTS

Figure 1:
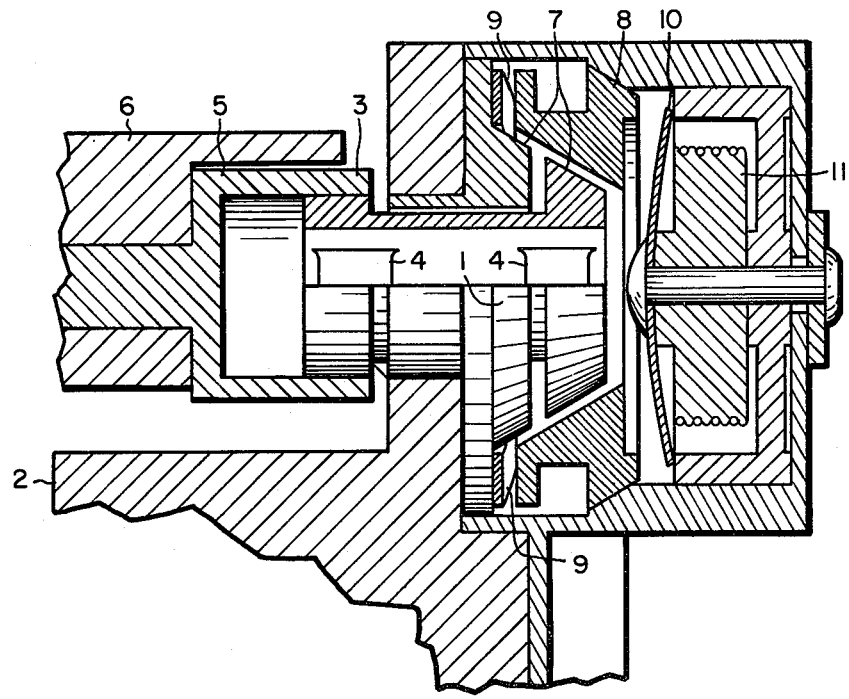
FIG. 1 is a longitudinal, partial cross-sectional view of a caging device according to the invention.

Referring to FIG. 1, outer member 1 of the flexural pivot is anchored to support member 2. Rotatable coaxial member 3 is supported by at least two flat springs 4 so that it is free to oscillate with a limited arc. One end of coaxial member 3 is coupled with shaft 5 to which is attached oscillating mirror 6. Truncated cones are cut on the relatively rotatable members 1, 3 to provide conically tapered clutch surfaces 7. These clutch surfaces are arranged in tandem, that is axially spaced, and are conically tapered from a common vertex so as to conform to a common conical surface configuration, as shown. A coaxial caging member in the form of a conical caging ring 8 is held in the open or disengaged position by wave spring 9. Bimetal spring 10 is bowed away from ring 8 when heater 11 is cold, leaving the flexural pivot in an uncaged position.

Figure 1A:
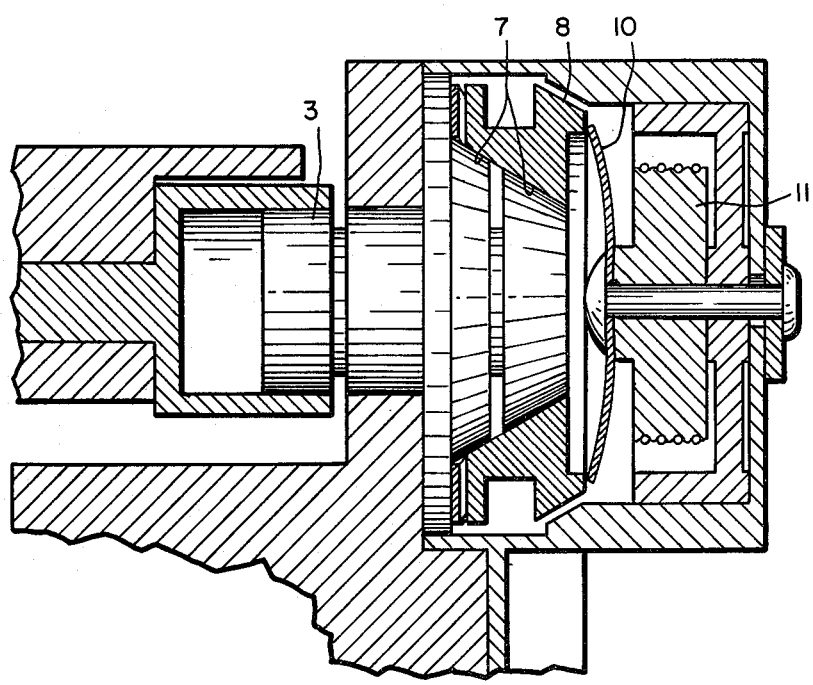
FIG. 1a is a view of the caging device of FIG. 1 in the caged position.

FIG. 1a shows conical caging ring 8 in the engaged position. The engaged position is effected by energizing heater 11 which bows bimetallic spring 10 towards the flexural pivot and moves conical ring 8 in an axial direction to engage the clutch surfaces 7. In this locked position, coaxial member 3 is sufficiently loaded to prevent the breaking or distortion of the flat springs in the flexural pivot.

Figure 2:
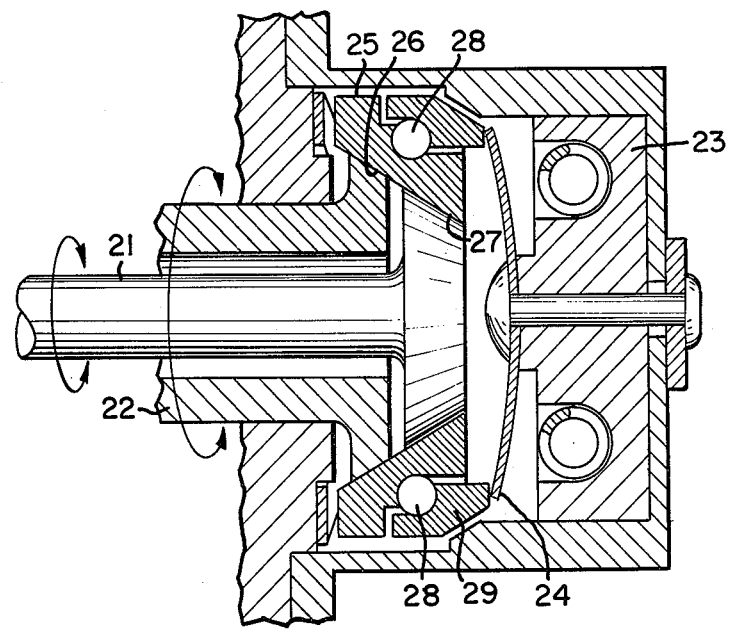
FIG. 2 is a longitudinal, partial cross-sectional view of a modified caging device.

Referring to FIG. 2, rotatable shafts 21 or 22 can be coupled to a power source while the other is coupled to work output. When heater 23 heats bimetallic spring 24, it axially presses conical caging member or ring 25 against the conically tapered clutch surfaces 26 and 27 of truncated cones, on the shafts 21 and 22 thus locking these shafts together. Conical ring 25 is freely rotatable, being held in place by ball bearings 28 and retainer 29.

Figure 3:
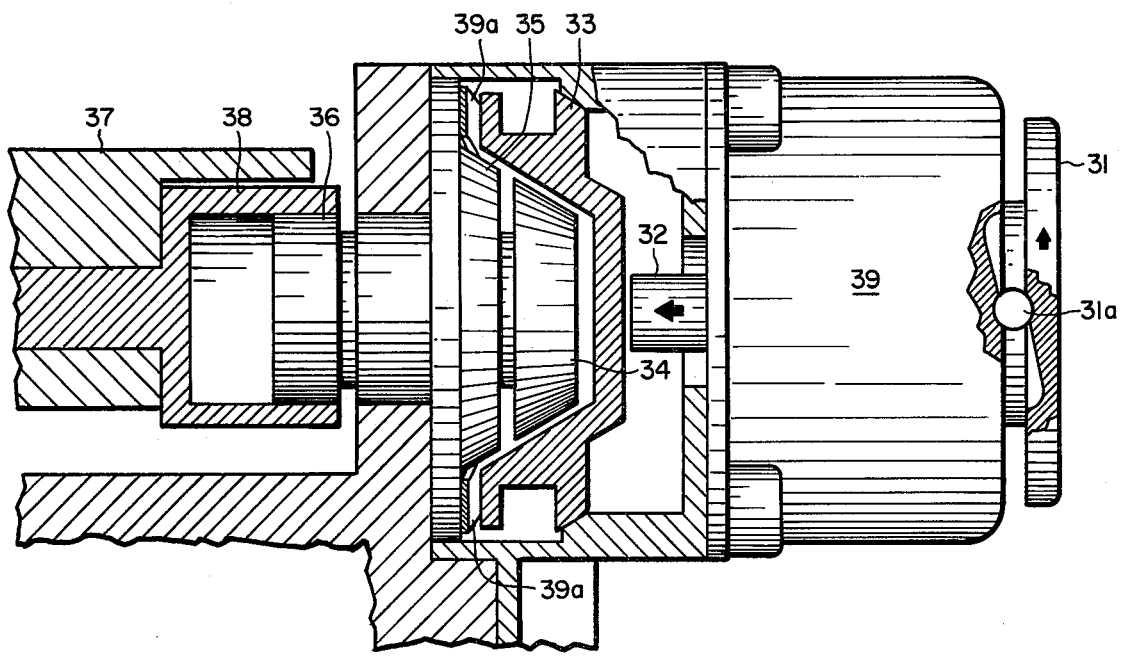
FIG. 3 is a longitudinal, partial cross-sectional view of a further modified caging device

FIG. 3 illustrates the caging mechanism actuated by a cam advance. In response to an electrical, a hydraulic, or a pneumatic impulse, cam advance 31 rotates clockwise until stopped by ball 31a, moving plunger 32 towards conical caging member or cup 33. Conical cup 33 moves axially to engage the conically tapered clutch surfaces 34 and 35 of truncated cones on the end of the flexural pivot. When conical cup 33 is engaged, the assembly comprising rotatable member 36, shaft 38, and oscillating mirror 37 are caged and no longer freely rotatable. Thus, danger of damage to the flexural pivots, which are attached to shaft 38 during periods of high dynamic loading, is minimized.

Mechanism for the electrical, hydraulic, or pneumatic impulse is contained in housing 39. The electrical impulse may be applied by means of a solenoid, while the hydraulic or the pneumatic impulse can be applied by a cylinder and piston mechanism. When the impulse is relaxed, wave spring 39a returns cup 33 and plunger 32 to the open position.

Figure 4:
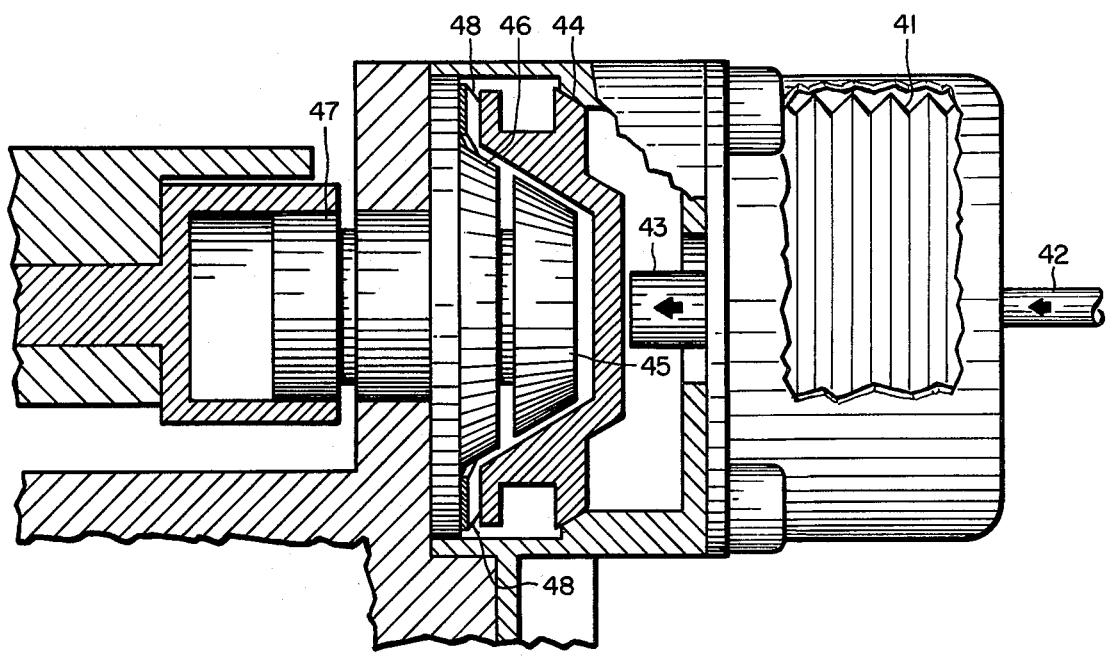
FIG. 4 is a longitudinal, partial cross-sectional view of a still further modified caging.

Referring to FIG. 4, an illustration of a bellows actuated caging device is shown. Bellows 41 is actuated by fluid entering port 42. As bellows 41 expands, plunger 43 presses conical caging member or cup 44 against the conically tapered clutch surfaces 45 and 46 of truncated cones on the rotatable member 47 and its support or housing to lock the rotatable member against turning. When the caging period is ended and the bellows pressure is relaxed, wave spring 48 returns cup 44 to the open position shown. Movement of cup 44 causes plunger 43 to collapse bellows 41. When bellows 41 collapses, the fluid filling bellows 41 flows out of port 41 into an appropriate reservoir.

The previous description and drawings serve to illustrate a few of the many embodiments which are possible. Other embodiments will become apparent to those skilled in the art, however, it is intended that any remotely operated caging device is contemplated by the scope of this invention as defined by the following claims.

I claim:

1. A caging device comprising:

a tubular shaft, a shaft extending concentrically through said tubular shaft, a support mounting said shafts for rotation relative to one another and to said support, coaxial, axially spaced frusto-conical clutch surfaces on said shafts, respectively, having a common vertex, a caging member including a conically tapered clutch surface coaxial with and of the same cone angle as said frusto-conical clutch surfaces, and actuating means for effecting movement of said caging member to and from an engaged caging position, wherein its clutch surface simultaneously engages the clutch surfaces of said shafts to lock the shafts against relative rotation.

2. A caging device comprising:

a pair of coaxial relatively rotatable members, a support mounting said members for relative rotation, one of said members comprising a shaft rotatable relative to said support, a first coaxial frusto-conical clutch surface on one end of said shaft, a second frusto-conical clutch surface on the other relatively rotatable member coaxially surrounding said shaft just inwardly of said shaft clutch surface, said clutch surfaces tapering to a smaller diameter in the direction of said shaft end and having a common vertex, a caging member located beyond said shaft end coaxial with said shaft and including a coaxially conically tapered clutch surface, and acutating means for effecting movement of said caging member to and from an engaged caging position wherein its clutch surface simultaneously engages the clutch surfaces of said relatively rotatable members to lock the latter members against relative rotation.

3. A caging device according to claim 2 wherein said second clutch surface is fixed to said support, and said caging member locks said shaft to said support when said caging member occupies its caging position.

4. A caging device according to claim 2 wherein said other relatively rotatable member is a tubular shaft concentrically surrounding said first mentioned shaft and rotatable in said support, and said caging member when a caging position locks said shafts to one another for rotation and unison.

5. A caging device according to claim 2 wherein said actuating means comprises an actuator on said support opposite said shaft end for urging said caging member toward said shaft to its caging position.

* * * * *